United States Patent

Buldini

[15] 3,690,433
[45] Sept. 12, 1972

[54] NONSYNCHRONOUS TRANSFER APPARATUS

[72] Inventor: Daniel A. Buldini, Revere, Mass.

[73] Assignee: Polaroid Corporation, Cambridge, Mass.

[22] Filed: July 16, 1970

[21] Appl. No.: 55,463

[52] U.S. Cl. .....................198/19, 198/110, 198/183
[51] Int. Cl........B65g 15/10, B65g 21/12, B23q 5/22
[58] Field of Search.........................198/19, 110, 183

[56] References Cited

UNITED STATES PATENTS

| | | | |
|---|---|---|---|
| 2,257,230 | 9/1941 | Drake | 198/183 |
| 2,762,496 | 9/1956 | McCaul | 198/183 |
| 2,953,234 | 9/1960 | Abendschein | 198/183 X |
| 2,959,273 | 11/1960 | Sykes | 198/183 |

FOREIGN PATENTS OR APPLICATIONS 731,455  6/1955  Great Britain.............198/181

*Primary Examiner*—Edward A. Sroka
*Attorney*—Brown and Mikulka and Sheldon W. Rothstein

[57] ABSTRACT

Closed loop conveyor apparatus for moving pallet supported workpieces comprising a pair of endless chain conveyors having guide rollers engaging guide rails, and pallet support rollers contacting the underside of the pallets. As a work station is approached, the support rollers may be rotated to slow down the speed of the pallets relative to the conveyors so that indexing means may remove the pallets from the conveyors and properly align the pallets at the work station. After a machining or assembly operation is completed, the pallets are replaced on the support rollers which may be rotated to smoothly increase their speed relative to that of the conveyors.

5 Claims, 6 Drawing Figures

INVENTOR.
DANIEL A. BULDINI

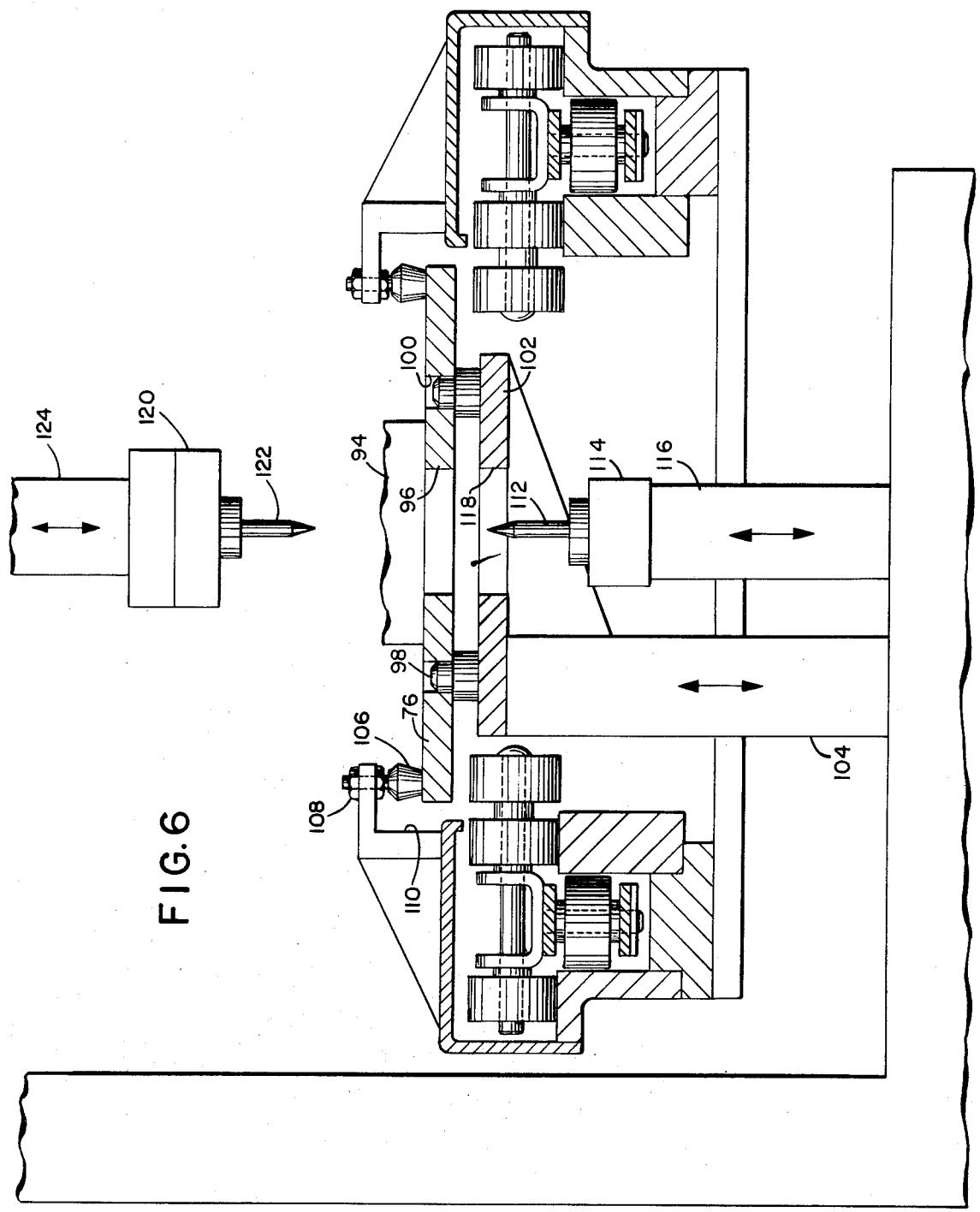

NONSYNCHRONOUS TRANSFER APPARATUS

The present invention relates to a closed loop conveyor system for nonsynchronously moving workpieces between successive automated work stations. This system is useful both where the workpiece is to have a machining operation performed on it at the work station and also where the workpiece constitutes a subassembly and additional parts are assembled thereon at the respective work stations. It is capable of making turns from a straight path in order to be accommodated to substantially any plant layout and eliminates return tracks, etc., since any segment of the closed loop may be utilized as a work station.

It is well known in the art that where a number of separate work steps or assembly operations are to be performed in a given sequence, it is often desirable to move the workpiece from station to station on some form of conveyor apparatus.

In contrast to one known general type of conveyor system in which the conveyors are synchronously driven and periodically simultaneously stopped at reselected stations, the system of the present invention is of the type in which the conveyors run substantially continuously in an endless path and the pallets carrying the workpieces may be stopped and removed from the conveyors at work stations and returned to the conveyors after the completion of the machining or assembling operation which is carried out at the work station.

The spacing of the pallets on the conveyor may be varied throughout the system depending upon the time requirements of the operations which will be carried out at the respective work stations. For example, for an automatic operation which is relatively fast, simple and trouble-free, the approaching pallets may be spaced relatively far apart. On the other hand, for an operation which is more time consuming, the pallets approaching this station may be spaced relatively close together.

The nonsynchronous pallet conveying system of the invention is applicable to convey articles to successive automatic machining operations at successive work stations or to successive automatic assembly operations or a combination thereof, and is also useful where manual operations are combined with automatic machining or assembly operations.

In accordance with a presently preferred embodiment of the invention, the pallet conveyor comprises a pair of parallel endless chains composed of pivotally interconnected links. Each chain conveyor has spaced pairs of upstanding flanges integrally attached to its upper portions. Fixed pins extend through apertures in these flanges and rotatable guide rollers are disposed on the pins in contact with guide tracks. Rotatable pallet support rollers are also disposed on the fixed pins and support and underside of the pallets. At selected locations in the system the speed of the pallet may be changed by imparting relative rotation to the support rollers. In order to decelerate the pallets a force component which acts in opposition to the direction of movement of the conveyor. Similarly, to accelerate the pallets, the rollers are rotated to impart to the pallets a force component which acts on the direction of movement of the conveyors. Such rotation may be imparted to the guide rollers by passing these rollers into contact with endless belts or similar means. In this fashion, the pallets may be decelerated as they approach a work station and in fact stopped at the work station even though the conveyor continues to move without interruption. At the work station, indexing means, which may be actuated either pneumatically, hydraulically or electrically, contacts the pallets to elevate them off of the conveyor while the machining or assembly operation is carried out. Thereafter, the pallets are returned to the conveyor and transferred to the next work station.

It is a primary object of the present invention to provide an improved pallet conveyor system for moving workpieces or other articles from one work station to another.

Another object of this invention is to provide a closed loop conveyor system capable of conforming to substantially any plant layout.

A further object is to provide a pallet conveyor system having pallet support rollers connected to the conveyor chains and adapted to either accelerate or decelerate the pallets as required in the system.

The above and other objects, features and advantages of the invention will become more apparent as this description proceeds.

IN THE DRAWINGS

FIG. 6 is a view primarily in vertical cross-section of the embodiment of FIG. 5 with one of the pallets being shown in an indexed position at a work station.

Figure 1:
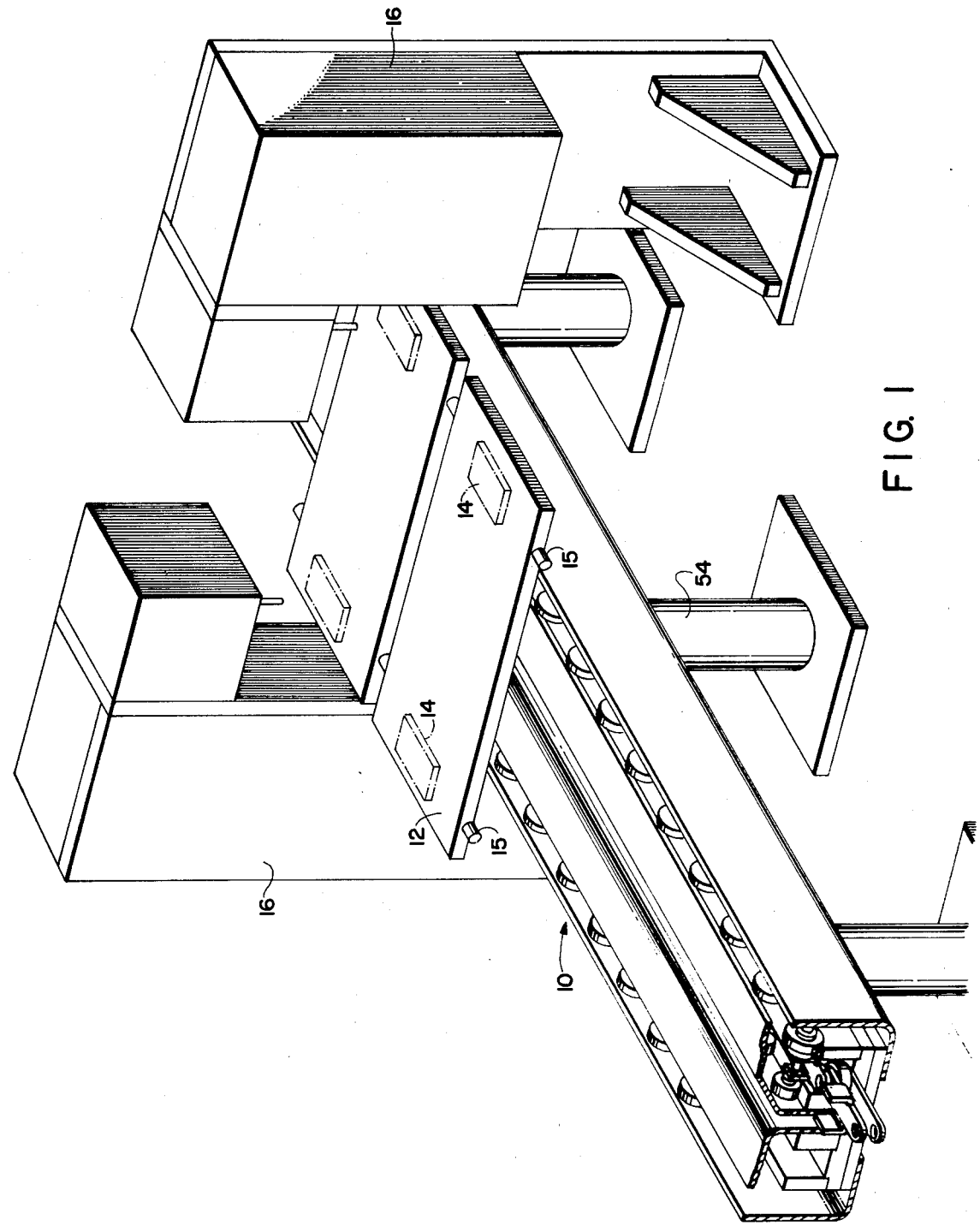
FIG. 1 is a perspective view partly in section of one embodiment of a pallet conveyor system in accordance with the present invention.

Referring now to the drawings, and more particularly to FIG. 1, reference numeral 10 generally designates the conveyor apparatus of one presently preferred embodiment of the invention upon which pallets 12 are conveyed in a generally horizontal position. In this embodiment, each pallet has mounted on it a pair of workpieces 14 which are shown in dot-dash lines. The conveyor carries the pallets past a plurality of work stations. A pair of opposed work stations 16 positioned to simultaneously act on the two work pieces on a given pallet are shown in FIG. 1 by way of illustration. The pallets preferably have spacers or bumpers 15 at their forward edges to lessen impact between adjacent pallets.

Figure 2:
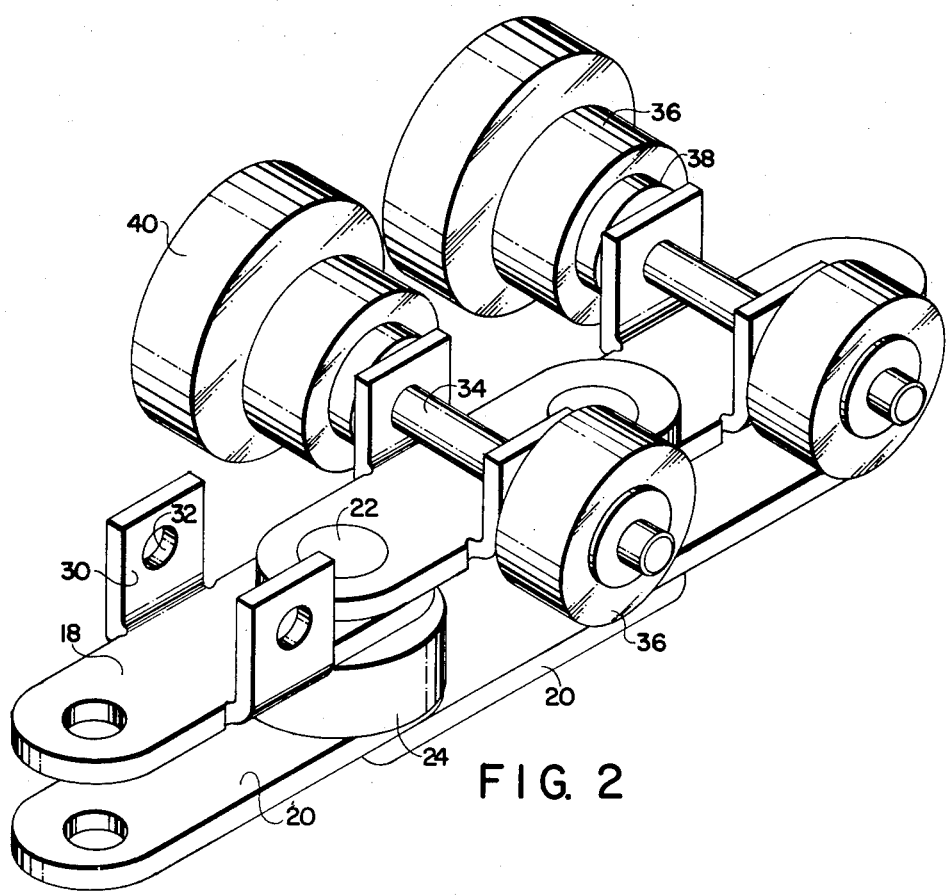
FIG. 2 is a perspective view of a section of an endless conveyor chain utilizing the present invention.
Figure 3:
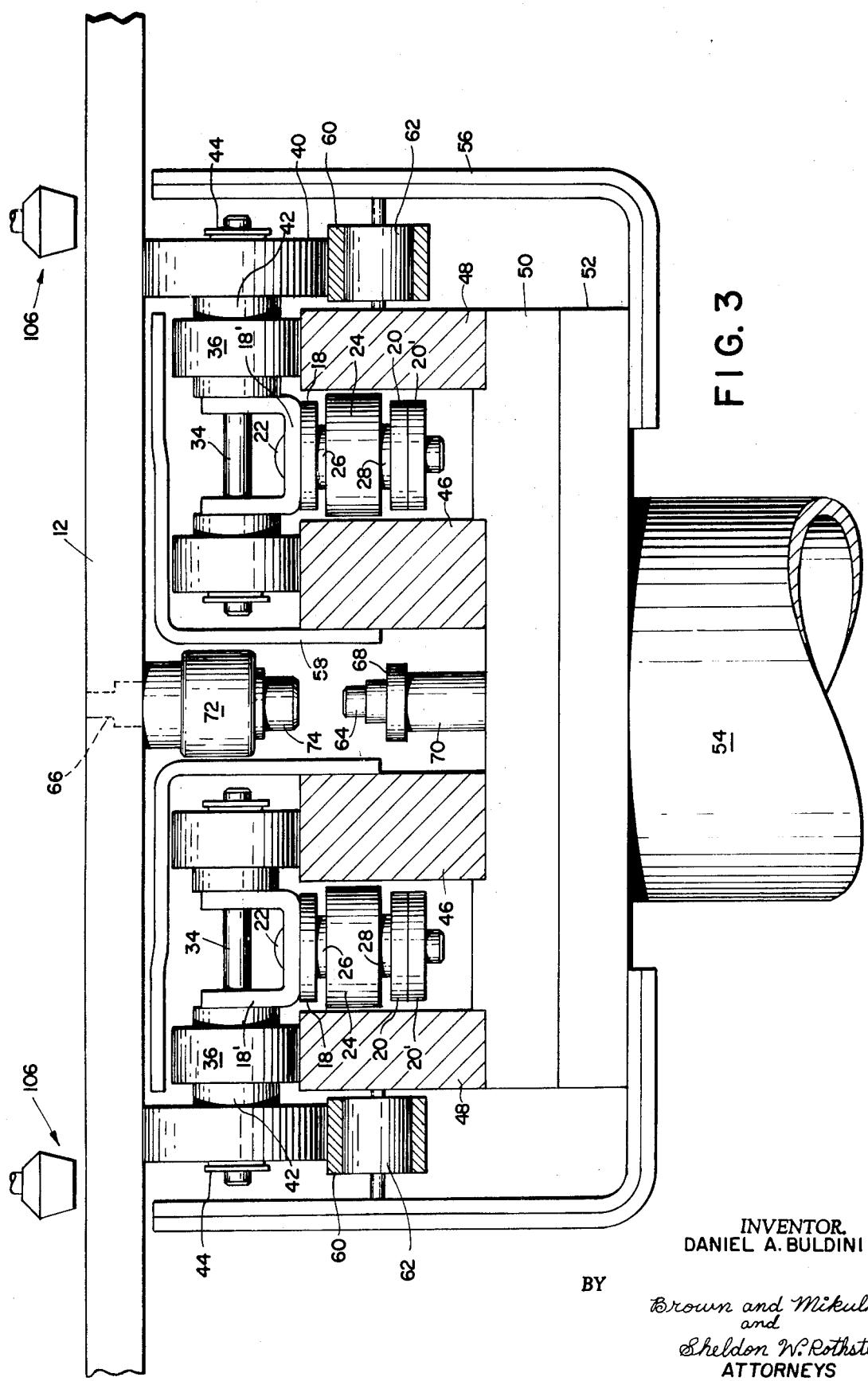
FIG. 3 is a vertical cross-sectional view of the embodiment of FIG. 1 taken at a point contiguous to a work station.

Referring to FIG. 2, the conveyor system includes a pair of spaced parallel endless roller chains. Each chain comprises a plurality of interconnected links constituted by an upper plate 18 and a lower plate 20 which are pivotable connected to the adjacent link by a headed pin 22. For the sake of clarity, the upper and lower plates of the rearmost of the two links shown in FIG. 3 are designated by reference numerals 18' and 20', respectively. A guide member 24, which is preferably rotatable, is positioned on each pin 22 spaced from the upper and lower plates by washers 26 and 28.

A pair of upstanding vertical flanges 30 are integrally connected to each upper plate at opposite sides thereof and each flange has an aperture 32 which is aligned with the aperture in its mating flange. A fixed rod 34 extends through each pair of apertures 32 with its ends extending outwardly beyond the flanges. A guide roller 36 is freely rotatably positioned at each end of each rod 34 and is spaced from adjacent flange 30 by a bearing 38. The outermost ends of rods 34, that is, the left-hand side of the left-hand conveyor of FIG. 3 and the right-hand side of the right-hand conveyor, project further than the other ends of the rods and also have larger pallet support, rollers 40 freely rotatable thereon, and spaced from the adjacent support rollers 22 by bearings 42. Lock washers 44 or other comparable means are placed upon the ends of the rods 34 to keep the rollers in position.

As best seen in FIG. 3, the guide rollers 36 move along inside and outside guide rails 46 and 48. These guide rails are integrally connected to a horizontal spacer plate 50, which is mounted on the support pad 52 of vertical post 54.

To maintain the conveyors in parallel alignment, the horizontal rollers 24 which are disposed on the vertical pivot pins 22 are located between the inner and outer guide rails 46 and 48.

For safety sake, the conveyors are substantially enclosed on each outer side by an essentially right angle shaped casing member 56 which has its short side united to the underside of support plate 52 and has its long side extending vertically almost to the underside of the pallets. Similarly, the conveyors are substantially enclosed on the top by inverted right-angle shaped casing members 58 which have one side united to the side of a respective inner guide rail 46 and have the other side extending generally horizontally below the path of conveyor travel nearly into contact with the pallet support rollers 40.

When the roller chains are driven by a suitable drive means, it is evident that the rollers will move along the guide rails 46 and 48 thereby moving the pallets which are resting on top of the support rollers 40 along the path of the conveyor system.

As a pallet approaches a work station, it may be advantageous to decelerate the pallet to facilitate possible removal of the pallet from the conveyor at the work station. Similarly, after the completion of the operation at the work station, the pallet may be returned to the conveyor and accelerated to the speed of the conveyor. These steps of deceleration and acceleration may be accomplished by regulating the rotational speed of the pallet guide rollers 40. In general, the support rollers 40 will tend to carry the pallets 12 along without any rotation of the support rollers so that the speed of the pallets corresponds to the speed of the conveyors. As a work station is approached, the pallets may be decelerated by causing the rollers 40 to come into contact with driven belts 60 mounted on drive rollers 62. Referring to FIG. 3, assuming that the conveyors are moving upwardly out of the plane of the sheet of drawing, the belts 60 are driven at a speed in excess of that of the conveyors with their upper passes similarly moving upwardly out of the plane of the sheet. Since the belts 60 are in contact with the rollers 40 this imparts rotation to the rollers 40 which concommitantly imparts to the pallets 12 a component of force which acts in a direction opposite to the direction of movement of the conveyors — thereby decelerating the pallets relative to the conveyors.

Figure 4:
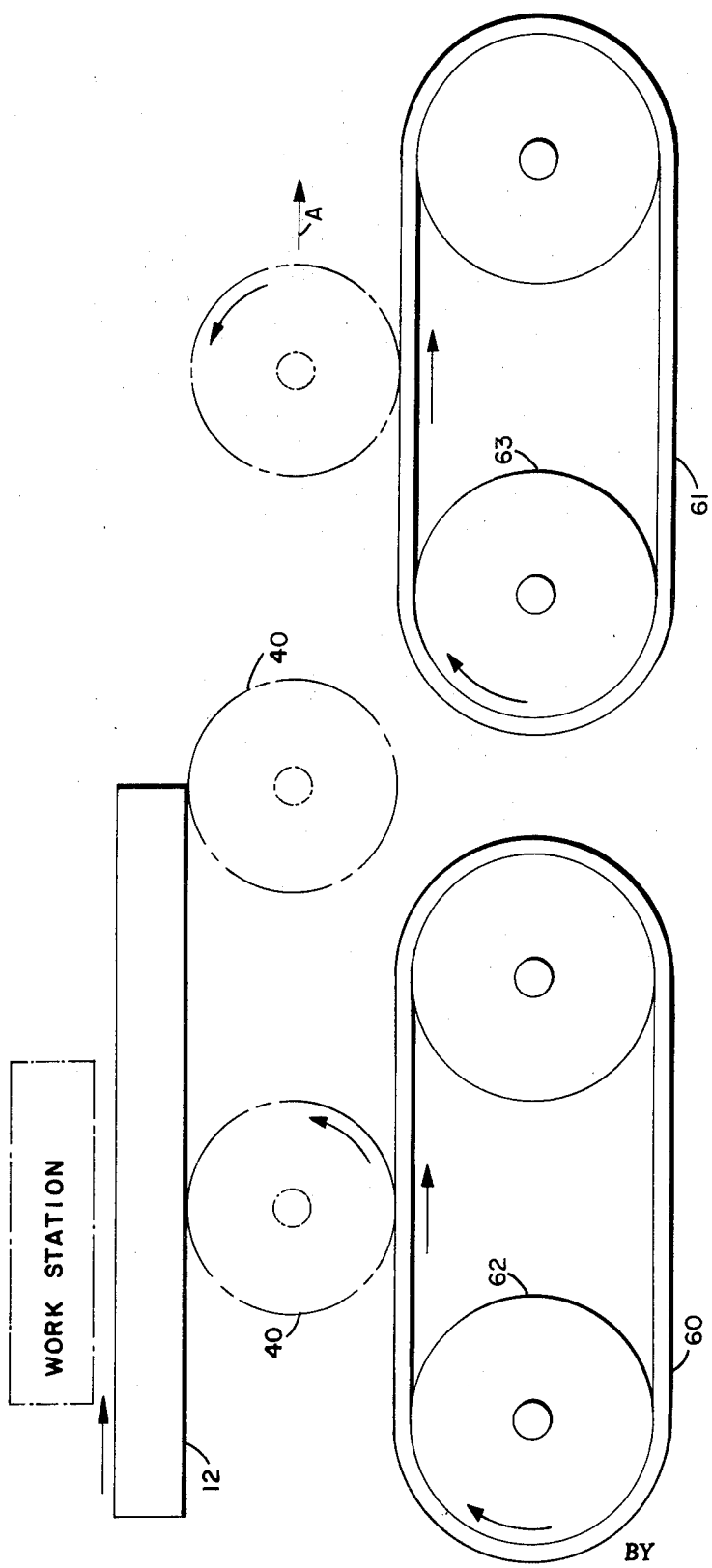
FIG. 4 is a diagrammatic representation of how the speed of a pallet is adjusted relative to the speed of the conveyor by imparting rotation to the pallet support rollers.

The regulation of the speed of the pallets is somewhat schematically illustrated in FIG. 4. As represented therein, with the conveyors moving at a uniform speed in the direction of the arrow A, belt 60 is rotated in the same direction but at a greater speed so that roller 40, contacted by belt 60, provides a decelerative force to pallet 12.

By appropriate regulation of the relative speeds of the conveyors and of belt 60, the pallet may not only be decelerated, but the pallet may be made to completely stop when the velocity of belt 60 is twice the velocity of the chain conveyors. The speed of belt 60 may be further adjusted after the pallet has slowed down to a speed at which it, in effect, becomes stationary of the work station.

Suitable indexing means to be described hereinafter may remove the pallet from the conveyor to enable the workpiece to undergo machining or assembling operations, and thereafter return the pallet to the conveyor. When the work is completed, the pallet then preferably passes into a region in which the rollers 40 are contacted by an endless belt 61 trained about drive rollers 63 to provide an accelerative force to the pallet relative to the chain conveyors as it travels away from the work station. This belt is similar in configuration and construction to belt 60 and is moving in the same direction as and at a speed slower than that of the conveyors. Whenever the belt providing speed control to the pallets travels at a speed greater than the chain conveyors, the pallets will decelerate relative to the chain conveyors. When the belt travels at a speed slower than the chain conveyors, the pallet will accelerate relative to the chain conveyors.

It will of course be understood that comparable results could be obtained using endless chains in lieu of the endless belts 60 and 61 in order to regulate the speed of the pallets.

As shown in FIG. 3, any suitable indexing means may be employed to elevate the pallet above the conveyor, and immobilize it while work is performed on the workpieces carried on the pallet, and then return the pallet to the conveyor system. By way of example, the indexing means may include a pair of vertically movable members having tapered heads 64 which engage within complimentarily shaped recesses 66 in the underside of the pallet 12 with a supporting surface 68 upon which the pallet rests. The indexing members reciprocated vertically upon post 70 which is actuated either pneumatically, hydraulically or electrically to bring the pallet in contact with bumper 106. It will of course be appreciated that suitable control means, not shown, are provided for controlling the indexing means. For example, the approach of a pallet into position for commencing the indexing operation may be sensed by a spring biased stop which when contacted by the pallet generates an electrical signal, or by photocells or the like. After the desired operation has been performed upon the workpieces, the end of the work operation may be indicated by an electrical signal generated at the conclusion of the work operation assuming that a machine operation is being performed. Alternatively, the pallets may be returned to the conveyors by lowering of the indexing means automatically after a predetermined time cycle has passed.

It is preferred to employ guide means to prevent lateral movement of the pallets and this may be accomplished by providing guides 72 which move in a track formed by the vertical legs of the casing members 58. The guides 72 are preferably rotatably mounted on shafts 74 which are secured to the underside of each pallet along its center line, one at the leading edge and one at the trailing edge thereof.

Figure 5:
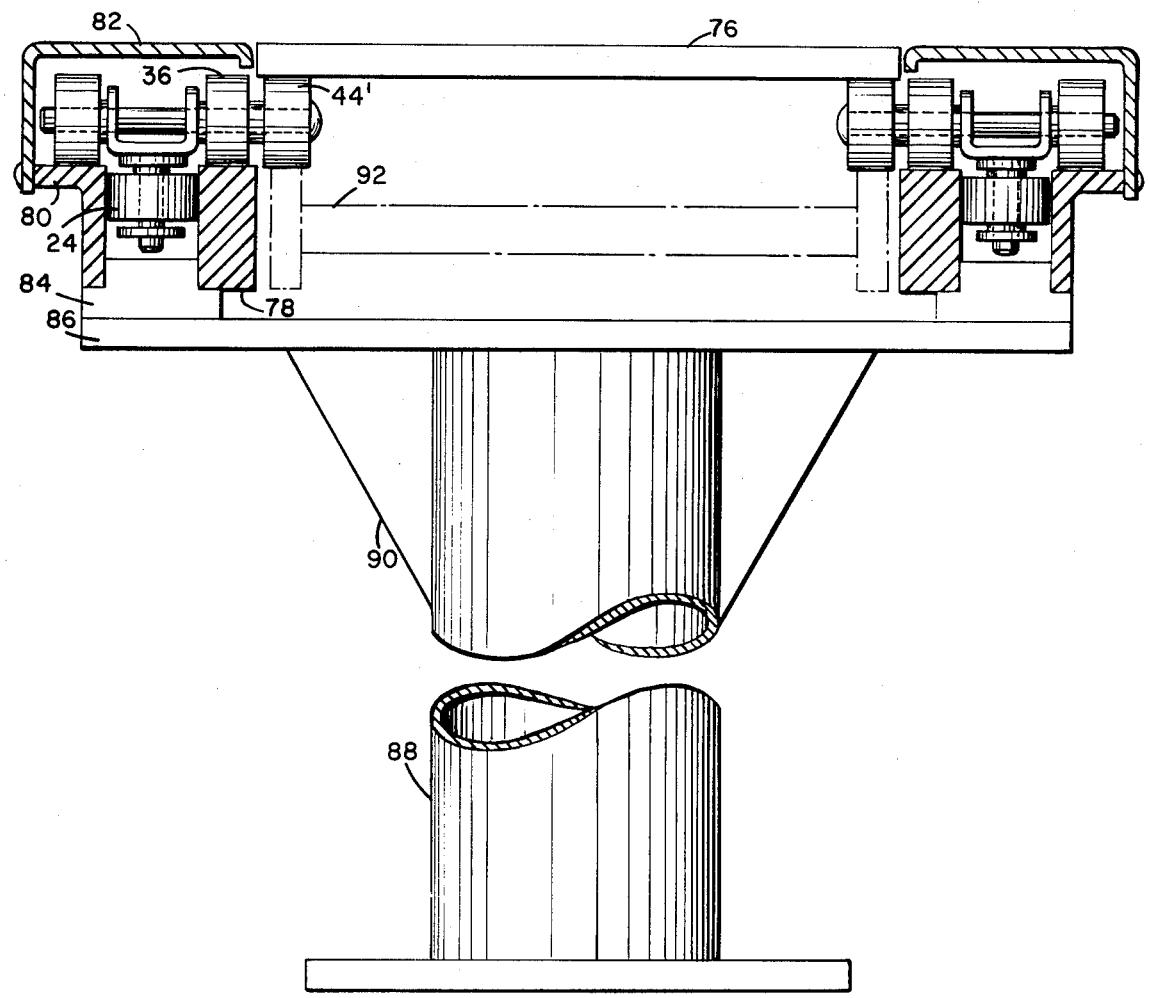
FIG. 5 is a vertical cross-sectional view similar to that of FIG. 3 but of another embodiment of the present invention.

FIGS. 5 and 6 illustrate another embodiment of the present invention in which the roller belt conveyors are disposed to the outside of a pallet 76. In this embodiment, like reference numerals are utilized to designate like parts of the roller conveyors of the previously described embodiment. As shown in FIG. 5, the pallets are supported upon support rollers 44' disposed at each side of the pallets. In this embodiment the support rollers 44' are the same size as the conveyor guide rollers 36. The guide rollers 36 travel along internal guide rails 78 and along the horizontal surface of an inverted angle iron 80 disposed at each side of the conveyor. The angle irons 80 in conjunction with right-angle shaped casing members 82 substantially enclose the conveyors for safety purposes. Guide rails 78 and the lower ends of the angle irons 80 are welded or otherwise suitably secured to spacers 84, generally less than about 2 inches wide and machined to maintain the proper distance between the guide rails 78 and the angle irons 80. The frame members are supported by transverse horizontal bars 86 which are disposed on vertical posts 88 and braces 90.

The horizontally disposed guide members 24 of the roller chains are laterally located between the inner surfaces of the angle irons 80 and the outer surfaces of guide rails 78 to provide lateral stability for the conveyors. The speed of rotation of the pallet support rollers 44' is adjusted to decelerate and accelerate of the pallets substantially as described in connection with the previous embodiment. For this reason, the support roller speed adjusting system in indicated diagrammatically in FIG. 5 by dot-dash lines and reference numeral 92. It will be appreciated that, like in the previous embodiment, this mechanism employs one belt contacting the underside of the support rollers 44' to cause deceleration of the pallets as a work station is approached and another belt to cause acceleration of the pallets leaving the work station.

Referring now to FIG. 6 in which a speed adjusting mechanism for the support rollers is not shown for purposes of clarity, a pallet 76 having a centrally disposed workpiece 94 covering a central opening 96 in the pallet is shown removed from the conveyor at a work station by suitable indexing means generally similar to that employed in the previously described embodiment. The indexing means include tapered heads 98 which engage in holes 100 in the pallet, and which are mounted upon a frame 102. This frame is adjusted vertically by actuation of a schematically illustrated piston 104. The extent of elevation of the pallet may be further regulated by providing at each side of the pallet a plurality of bumpers 106 which contact the top of the pallet. The bumpers may be adjusted vertically via stems threadably disposed in nuts 108 which are rigidly connected to supports 110.

For purposes of illustration only, the work station shown in FIG. 6 comprises an upper tool holder 120 in which there is mounted a drill or similar tool 122. The tool holder is reciprocated by a suitable mechanism 124 to and away from the workpiece 94 by means of suitable automatic controls in order to perform a work function on the upper surface of the workpiece 94. At the same time, a tool 112 mounted in a tool holder 114 is moved into contact with the lower surface of the workpiece via a suitable reciprocating mechanism 116. The lower tool 112 passes through an aperture 118 in the indexing means support 102 and through the aperture 96 in the pallet in order to contact the workpiece 94.

While presently preferred embodiments of the invention have been shown and described with particularity, it will be appreciated that various changes and modifications may readily suggest themselves to those of ordinary skill in the art upon being apprised on the present invention. It in intended to encompass all such changes and modifications as fall within the scope and spirit of the appended claims.

What is claimed is:

1. A workpiece conveyor system wherein a plurality of pallets are independently substantially horizontally transported between a plurality of work stations disposed along a conveyor line comprising: a pair of independent endless roller chain conveyors disposed parallel to one another, each of said roller chain conveyors including a plurality of substantially horizontally pivotally interconnected links, and independently rotatable pallet support rollers; rail means for supporting said endless roller chain conveyors; guide means engaging said endless roller chain conveyors and adapted to ride against said rail means in order to guide said endless roller chain conveyors along a predetermined path; and means in direct communication with same of said pallet support rollers to adjust the rate of rotation of said pallet support rollers in order to regulate the speed of pallets supported thereby relative to the speed of the chain conveyors.

2. Apparatus according to claim 1, wherein said means to regulate the rate of rotation of said pallet support rollers comprises: first endless belt means for contacting the periphery of said support rollers to impart rotation thereto decelerate said pallets relative to the endless roller chain conveyors; and second endless belt means for contacting the periphery of said support rollers to impart rotation thereto to accelerate said pallets relative to the endless roller chain conveyors.

3. Apparatus according to claim 1, further comprising inner and outer casing members substantially enclosing said endless roller chain conveyors. chain 4. Apparatus according to claim 1, wherein said endless roller chain conveyors are located substantially vertically beneath said pallets and said pallet support rollers are larger than said guide rollers.

5. Apparatus according to claim 1, wherein said endless roller chain conveyors are disposed laterally of and below said pallets, and said pallet support rollers are disposed directly beneath said pallets.

* * * * *